United States Patent

Liou

[11] Patent Number: 5,514,042
[45] Date of Patent: May 7, 1996

[54] MULTISTAGE SPROCKET MECHANISM FOR A BICYCLE

[76] Inventor: Yan-Shing Liou, No. 29 Shi-Shr Road, Fong-Yuan City, Taichung Hsien, Taiwan

[21] Appl. No.: 509,729

[22] Filed: Aug. 1, 1995

[51] Int. Cl.⁶ ................................................. F16H 55/30
[52] U.S. Cl. ........................................ 474/160; 474/164
[58] Field of Search ................................. 474/152, 153, 474/160, 164

[56] References Cited

U.S. PATENT DOCUMENTS

| | | | |
|---|---|---|---|
| 536,813 | 4/1895 | MacPhail et al. | 474/152 |
| 619,537 | 2/1899 | Bufford | 474/156 |
| 3,478,614 | 11/1969 | Shimano | 474/160 |
| 3,498,148 | 3/1970 | Gerbasi et al. | 474/154 |
| 3,756,091 | 9/1973 | Miller | 474/153 |
| 3,772,932 | 11/1973 | Nagano | 474/160 |
| 3,956,943 | 5/1976 | Yamasaki | 474/160 X |
| 4,018,095 | 4/1977 | Shimano | 474/160 X |
| 4,268,259 | 5/1981 | Segawa et al. | 474/160 |
| 4,330,286 | 5/1982 | Nagano | 474/164 |
| 4,394,865 | 5/1983 | Ueno | 474/162 X |
| 4,521,207 | 6/1985 | Husted | 474/164 X |
| 4,773,893 | 9/1988 | Su et al. | 474/160 X |
| 4,813,916 | 3/1989 | Valin | 474/152 |
| 4,889,521 | 12/1989 | Nagano | 474/164 |
| 5,133,695 | 7/1992 | Kobayashi | 474/160 |
| 5,192,249 | 3/1993 | Nagano | 474/160 |

*Primary Examiner*—Roger J. Schoeppel
*Attorney, Agent, or Firm*—Morton J. Rosenberg; David I. Klein

[57] ABSTRACT

A multistage sprocket mechanism includes one or more sprockets each having two groups of teeth alternatively formed in the peripheral portion. The sprockets each includes two surfaces having a number of recesses and depressions alternatively formed in the peripheral portion and arranged close to the groups of the teeth. The recesses and the depressions each has a tapered bottom arranged corresponding to the respective groups of teeth for engaging with the driving chain and for reducing a friction between the driving chain and the sprockets.

1 Claim, 2 Drawing Sheets

MULTISTAGE SPROCKET MECHANISM FOR A BICYCLE

BACKGROUND OF THE INVENTION

1. Field of the Invention

The present invention relates to a sprocket, and more particularly to a multistage sprocket mechanism for a bicycle.

2. Description of the Prior Art

Typical multistage sprocket mechanisms are mounted on a crank or a rear hub of a bicycle and comprise a number of sprockets for engaging with a driving chain and spaced from each other at a predetermined interval. In order to facilitate the shifting of the driving chain from one of the sprockets to the other sprocket, various kinds of ideas have been developed to improve the same. The prior multistage sprocket mechanisms comprise: U.S. Pat. No. 536,813 to Macphail et al.; U.S. Pat. No. 619,537 to Bufford; U.S. Pat. No. 1,583,221 to Carlson; U.S. Pat. No. 3,478,614 to Shimano; U.S. Pat. No. 3,498,148 to Gerbasi et al.; U.S. Pat. No. 3,756,091 to Miller; U.S. Pat. No. 3,772,932 to Nagano; U.S. Pat. No. 3,956,943 to Yamasaki; U.S. Pat. No. 4,018,095 to Shimano; U.S. Pat. No. 4,268,259 to Segawa et al.; U.S. Pat. No. 4,330,286 to Nagano; U.S. Pat. No. 4,521,207 to Husted; U.S. Pat. No. 4,773,893 to Su et al.; U.S. Pat. No. 4,8113,916 to Valin; U.S. Pat. No. 4,889,521 to Nagano; and U.S. Pat. No. 5,133,695 to Kobayashi. Some of the prior arts comprise a number of teeth having recesses formed in the side portions for engaging with the chains so as to facilitating the shifting of the driving chain. In U.S. Pat. No. 4,889,521 to Nagano, the sprockets each includes one side having a number of recesses formed thereon and extended beyond the teeth so as to form chain guide portions for engaging with the driving chain and for facilitating the engagement of the driving chain with the sprockets and for preventing the driving chain from engaging with the other sprockets. However, after the driving chain has been shifted from one sprocket to the other sprocket, the driving chain may will be engaged with the previous sprocket.

The present invention has arisen to mitigate and/or obviate the afore-described disadvantages of the conventional multistage sprocket mechanisms.

SUMMARY OF THE INVENTION

The primary objective of the present invention is to provide a sprocket which includes chain guide portions formed on both sides thereof so as to prevent the driving chain from engaging with the previous sprocket after shifted from the previous sprocket to the following sprocket.

In accordance with one aspect of the invention, there is provided a multistage sprocket mechanism for a bicycle comprising at least two sprockets, the sprockets each including a peripheral portion having at least two first groups of teeth and at least two second groups of teeth alternatively formed thereon, the first groups of teeth each including a first tooth and a second tooth and a third tooth and a fourth tooth arranged in series, the second groups of teeth each including a first tooth and a second tooth and a third tooth arranged in series, the first tooth of the first groups of teeth being arranged close to the third tooth of the second groups of teeth, the sprockets each including a first surface having at least two recesses formed therein, the recesses each including a first end having a largest depth arranged close to the first tooth of the second groups of teeth and each including a second end having a smallest depth arranged close to the third tooth of the second groups of teeth, the recesses each including a middle portion having an intermediate depth arranged close to the second tooth of the second groups of teeth, the sprockets each including a second surface opposite to the first surface and having at least two depressions formed therein, the depressions each including a first end having a largest depth arranged close to the first tooth of the first groups of teeth and each including a second end having a smallest depth arranged close to the third tooth of the first groups of teeth, the depressions each including a middle portion having an intermediate depth arranged close to the second tooth of the first groups of teeth. The recesses and the depressions are provided for engaging with the driving chain and for reducing a friction between the driving chain and the sprockets.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
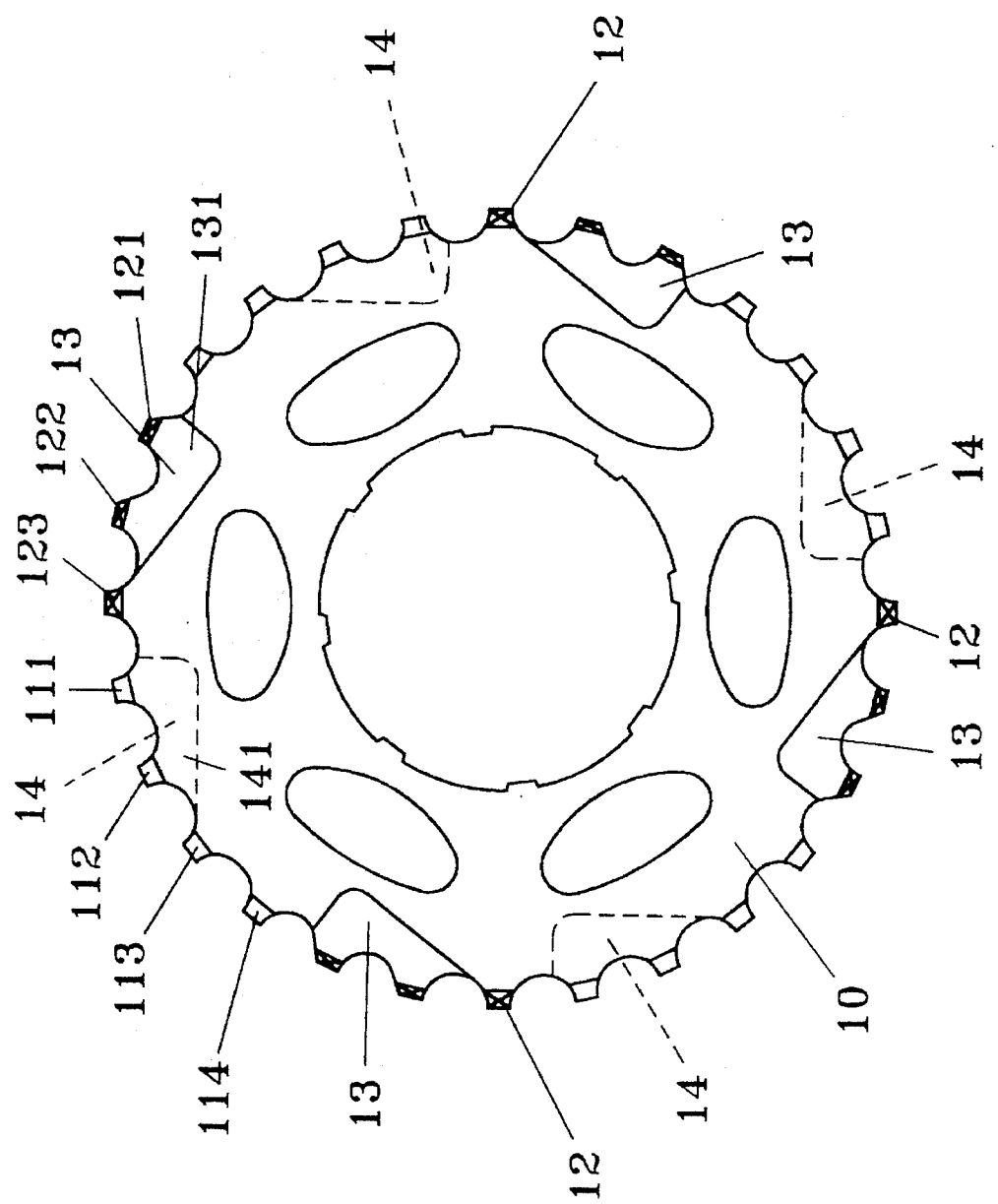
FIG. 1 is a plane view of a sprocket in accordance with the present invention.

Referring to the drawings, and initially to FIG. 1, a multistage sprocket mechanism for a bicycle in accordance with the present invention is mounted on a crank or a rear hub of a bicycle and comprises two or more sprockets 10 for engaging with a driving chain and spaced from each other at a predetermined interval. The sprocket 10 comprises a front surface and a rear surface and comprise a peripheral portion having a number of teeth 11, 12 alternatively formed thereon. It is preferable that a first group of about four teeth 11 are arranged close to each other, and a second group of about three teeth 12 are arranged close to each other.

The front surface of the sprocket 10 includes a peripheral portion having two or more recesses 13 formed therein for engaging with the link plates of the typical driving chain. The recesses 13 each includes a tapered bottom 131 and each includes one end having the largest depth arranged closed to the first tooth 121 of the second group of teeth 12 and each includes the other end having the smallest depth arranged closed to the third tooth 123 of the second group of teeth 12, such that the driving chain may be suitably guided to engage with the third tooth 123 of the second group of teeth 12. The tapered bottom 131 has an intermediate depth arranged close to the second tooth 122.

The rear surface of the sprocket 10 includes a peripheral portion having two or more depressions 14 formed therein for engaging with the link plates of the typical driving chain. The depressions 14 each includes a tapered bottom 141 and each includes one end having the largest depth arranged closed to the first tooth 111 of the first group of teeth 11 and each includes the other end having the smallest depth arranged closed to the third tooth 113 of the first group of teeth 11, such that the driving chain may engage with the depressions 14 after engaging with the third tooth 123 of the second group of teeth 12. The tapered bottom 141 has an intermediate depth arranged close to the second tooth 112 of the first group of teeth 11. The first group of teeth 11 includes a fourth tooth 114 that has no recesses or depressions formed therein.

Figure 2:
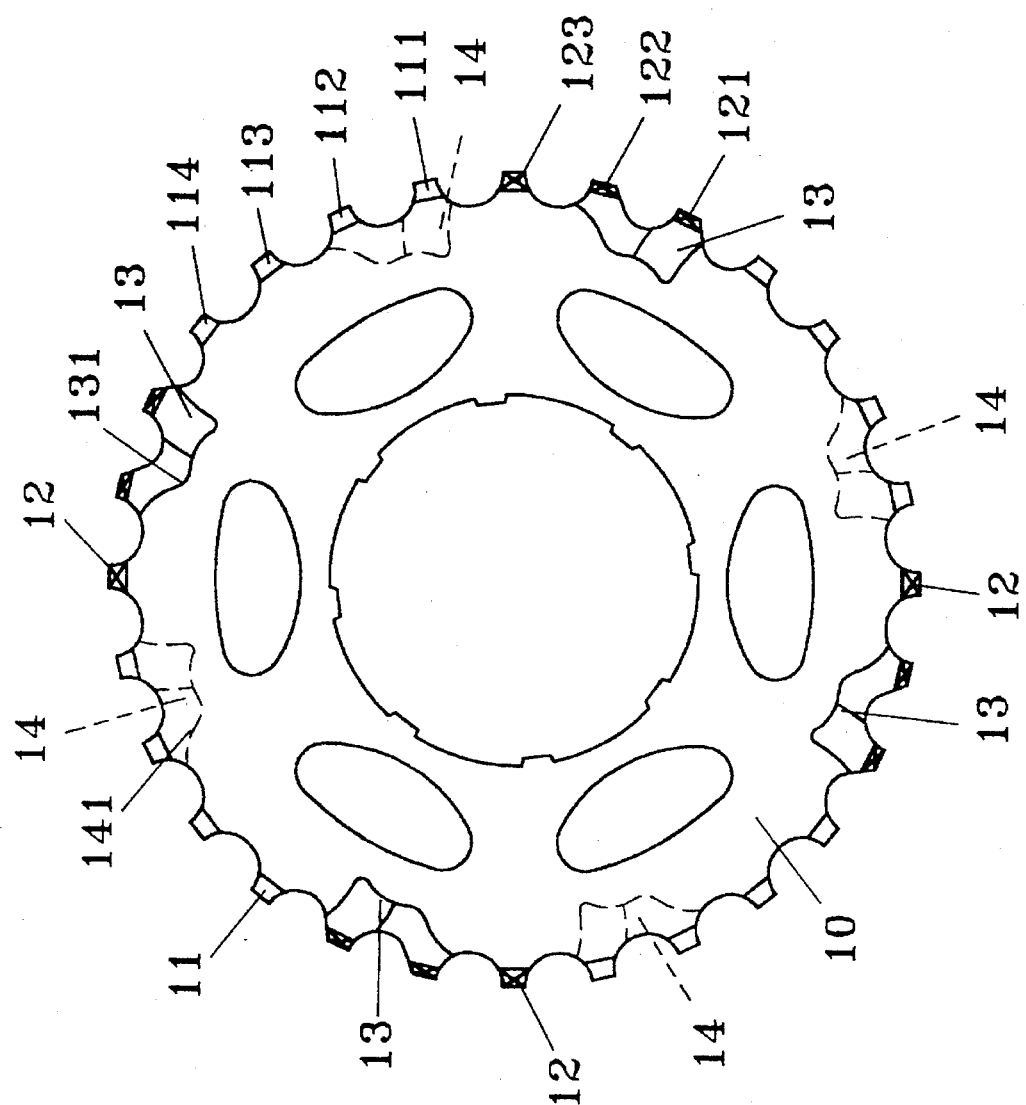
FIG. 2 is a plane view similar to FIG. 1, illustrating another embodiment of the sprocket.

Referring next to FIG. 2, illustrated is another embodiment of the sprocket of the multistage sprocket mechanism for the bicycle. The bottoms of the recesses 13 and of the depressions 14 may include a suitably curved or wave-shaped configuration for engaging with the link plates of the driving chain.

Accordingly, the multistage sprocket mechanism in accordance with the present invention includes a sprocket having a peripheral portion that includes recesses and depressions alternatively formed on both sides thereof so as to engage with the driving chain and so as to reduce the friction between the driving chain and the sprocket.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A multistage sprocket mechanism for a bicycle comprising:

at least two sprockets, said sprockets each including a peripheral portion having at least two first groups of teeth and at least two second groups of teeth alternatively formed thereon, said first groups of teeth each including a first tooth and a second tooth and a third tooth and a fourth tooth arranged in series, said second groups of teeth each including a first tooth and a second tooth and a third tooth arranged in series, said first tooth of said first groups of teeth being arranged close to said third tooth of said second groups of teeth, said sprockets each including a first surface having at least two recesses formed therein, said recesses each including a first end having a largest depth arranged close to said first tooth of said second groups of teeth and each including a second end having a smallest depth arranged close to said third tooth of said second groups of teeth, said recesses each including a middle portion having an intermediate depth arranged close to said second tooth of said second groups of teeth, said sprockets each including a second surface opposite to said first surface and having at least two depressions formed therein, said depressions each including a first end having a largest depth arranged close to said first tooth of said first groups of teeth and each including a second end having a smallest depth arranged close to said third tooth of said first groups of teeth, said depressions each including a middle portion having an intermediate depth arranged close to said second tooth of said first groups of teeth, said recesses and said depressions being provided for engaging with the driving chain and for reducing a friction between the driving chain and said sprockets.

* * * * *